US008176228B2

(12) United States Patent
Tsai

(10) Patent No.: US 8,176,228 B2
(45) Date of Patent: May 8, 2012

(54) QUICK PORT-SWITCHING METHOD AND ASSOCIATED APPARATUS

(75) Inventor: Meng-Che Tsai, Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 902 days.

(21) Appl. No.: 12/212,883

(22) Filed: Sep. 18, 2008

(65) Prior Publication Data

US 2009/0079717 A1 Mar. 26, 2009

(30) Foreign Application Priority Data

Sep. 21, 2007 (TW) ................................ 96135467 A

(51) Int. Cl.
*G06F 13/00* (2006.01)

(52) U.S. Cl. ........................................ 710/302; 386/231

(58) Field of Classification Search .................. 710/302, 710/300–301; 386/231; 348/705
See application file for complete search history.

(56) References Cited

U.S. PATENT DOCUMENTS

| | | | | |
|---|---|---|---|---|
| 7,398,547 | B2 * | 7/2008 | deCarmo | 726/3 |
| 2007/0280646 | A1 * | 12/2007 | Seita et al. | 386/96 |
| 2007/0283071 | A1 * | 12/2007 | Konishi | 710/302 |
| 2010/0321585 | A1 * | 12/2010 | Kurokawa | 348/705 |

* cited by examiner

*Primary Examiner* — Clifford Knoll
(74) *Attorney, Agent, or Firm* — Edell, Shapiro & Finnan, LLC

(57) ABSTRACT

A quick port-switching method and associated apparatus are provided. A quick port-switching display control circuit includes a display controller, a first TMDS port, a second TMDS port and an analog video port. The display controller has a first GPIO pin and a second GPIO pin. The first TMDS port, second TMDS port and analog video port are coupled to the display controller for receiving a first TMDS input, a second TMDS input and an analog video signal, respectively. The first TMDS input and second TMDS input include a first hot-plugging signal and a second hot-plugging signal to be received by the first GPIO pin and second GPIO pin, respectively. The display controller determines whether the first TMDS input is valid by detecting whether the first hot-plugging signal is asserted, and determines whether the second TMDS input is valid by detecting whether the second hot-plugging signal is asserted.

20 Claims, 3 Drawing Sheets

QUICK PORT-SWITCHING METHOD AND ASSOCIATED APPARATUS

FIELD OF THE INVENTION

The present invention relates to a port-switching method and an associated apparatus, and more particularly to a quick port-switching method and an associated apparatus having multiple HDMI/DVI ports.

BACKGROUND OF THE INVENTION

Conventionally, computer monitors receive Video Graphic Array (VGA) signals and display images accordingly. To upgrade video quality, Digital Visual Interface (DVI) and High-Definition Multimedia Interface (HDMI) specifications have been developed for displaying high quality video. HDMI, for example, is capable of concurrently processing audio/video signals, has been widely adopted, and has become the mainstream of high quality video display.

A conventional high-end computer monitor has dual VGA video ports, which are also known as D-sub. VGA is used for analog signal transmission. Dual VGA video ports are commonly referred to as a two-analog-port (2A) or one-analog-plus-one-analog-port (1A+1A) structure. Referring to FIG. 1, the high-end computer monitor (not shown) has a display controller 100 having dual VGA video ports for receiving two VGA signals 102 and 104, which are then outputted as an output signal and displayed on the monitor. In accordance with traditional standards of the display industry, port switching of dual VGA video ports must be completed within 2 seconds.

As HDMI prevails, high-end computer monitors are now equipped with multiple HDMI ports and a VGA video port for digital and analog transmissions, respectively. For instance, a high-end computer monitor has a VGA video port and two HDMI ports, which is referred to as a one-analog-plus-two-digital (1A+2D) structure since VGA transmits analog signals and HDMI transmits digital signals. Referring to FIG. 2, the high-end computer monitor (not shown) has a display controller 200 conforming to 1A+2D transmission standards. The display controller 200 has a VGA video port and two HDMI ports for receiving a VGA video signal 202 and two HDMI inputs 204 and 206, respectively, to produce an output signal to be displayed on the monitor. In following prior requirements of the display industry on 2A computer monitors, port switching process of the display controller 200 of the 1A+2D computer monitor is also expected to complete within 2 seconds. To those skilled in the related field, it is understood that, generally, VGA video port detection takes 0.5 second, and HDMI port detection takes 2 seconds or even longer. As a result, time needed to complete detection of 1A+2D ports according to the conventional art is at least 4.5 seconds, which is far longer than the traditional 2 second expectation.

For the foregoing reasons, there is a need for a solution that can quickly switch ports.

SUMMARY OF THE INVENTION

The present invention provides a display control circuit comprising a display controller, a first TMDS (Transition Minimized Differential Signal) port, a second TMDS port, and an analog video port. The display control circuit has a first GPIO pin and a second GPIO pin. The first TMDS port, second TMDS port and analog video port are coupled to the display controller, and are for receiving a first TMDS input, a second TMDS input and an analog video signal, respectively. The first TMDS input and second TMDS input comprise a first hot-plugging signal and a second hot-plugging signal to be received by the first GPIO pin and second GPIO pin, respectively. The display controller determines whether the first TMDS input is valid by detecting whether the first hot-plugging signal is asserted, and the display controller determines whether the second TMDS input is valid by detecting whether the second hot-plugging signal is asserted.

The present invention also provides a display controller comprising a first hot-plugging pin, a second hot-plugging pin, a first GPIO pin and a second GPIO pin. The first GPIO pin and second GPIO pin are coupled to the first hot-plugging pin and second hot-plugging pin for receiving a first hot-plugging signal of a first TMDS input, and a second hot-plugging signal of a second TMDS input, respectively. The display controller determines whether the first TMDS input is valid by detecting whether the first hot-plugging signal is asserted, and the display controller determines whether the second TMDS input is valid by detecting whether the second hot-plugging signal is asserted.

The present invention further provides a quick port-switching method comprising steps of detecting a first hot-plugging signal of a first TMDS port to determine whether the first hot-plugging signal is valid by detecting whether the first hot-plugging signal is asserted, followed by reading Extended Display Identification Data (EDID) and decrypting High-bandwidth Digital Content Protection (HDCP) data in sequence; detecting a second hot-plugging signal of a second TMDS port to determine whether the second hot-plugging signal is valid by detecting whether the second hot-plugging signal is asserted; and detecting an analog video signal to determine whether the analog video signal is valid. The TMDS ports are HDMI ports or DVI ports.

To better understand the characteristics and technical contents of the invention, detailed descriptions of preferred embodiments shall be given with the accompanying drawings below.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

Figure 1:
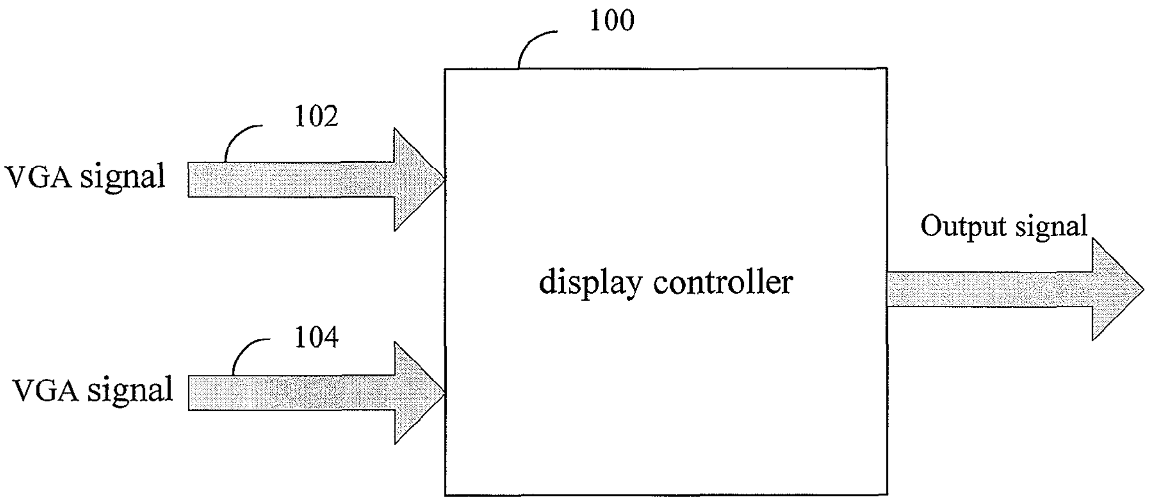
FIG. 1 (Prior Art)
FIG. 1 is a display controller in an advanced 2A computer monitor according to the prior art.
Figure 2:
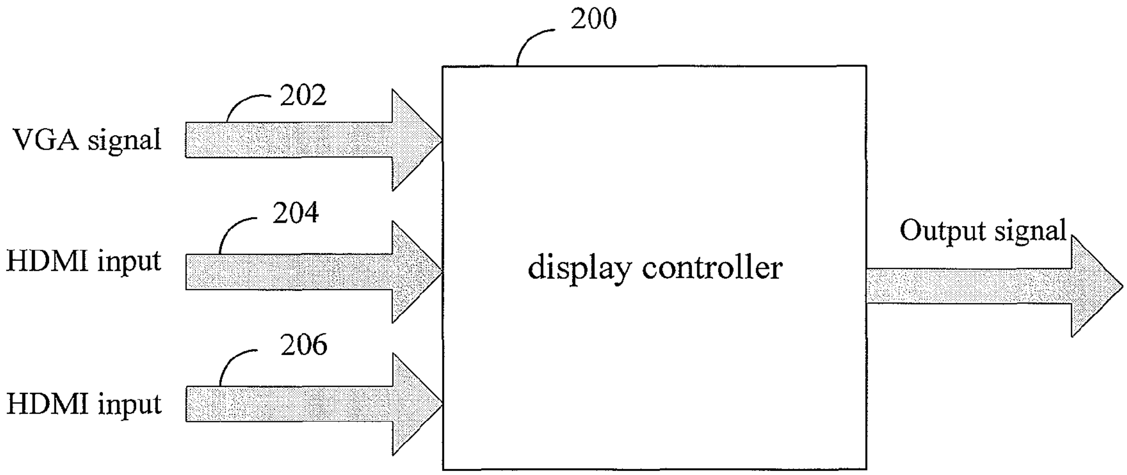
FIG. 2 (Prior Art)
FIG. 2 is a display controller in an advanced 1A+2D computer monitor according to the prior art.
Figure 3:
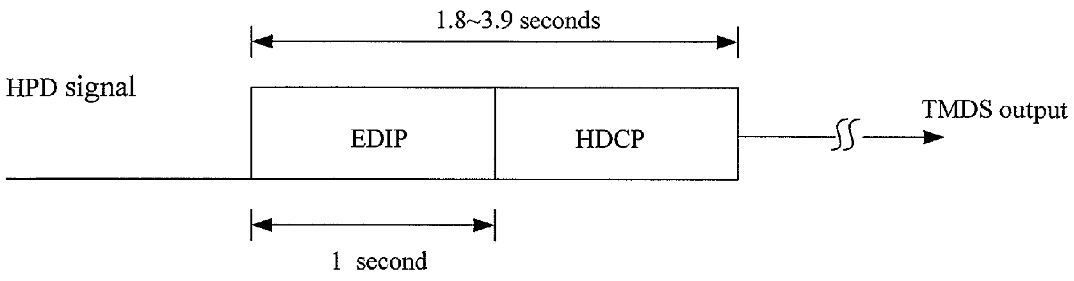
FIG. 3 is a schematic diagram of a hot-plugging signal.

FIG. 3 shows a schematic diagram of Hot Plug Detect (HPD) signal. A typical HDMI signal transmits, according to status of HPD signal, Extended Display Identification Data (EDID), High-bandwidth Digital Content Protection (HDCP) data, and then Transition Minimized Differential Signal (TMDS) in sequence. EDID and HDCP data are decoded to determine the presence of TMDS transmission on the HDMI port. Decoding EDID and HDCP data transmission takes approximately between 1.8 and 3.9 seconds.

Figure 4:
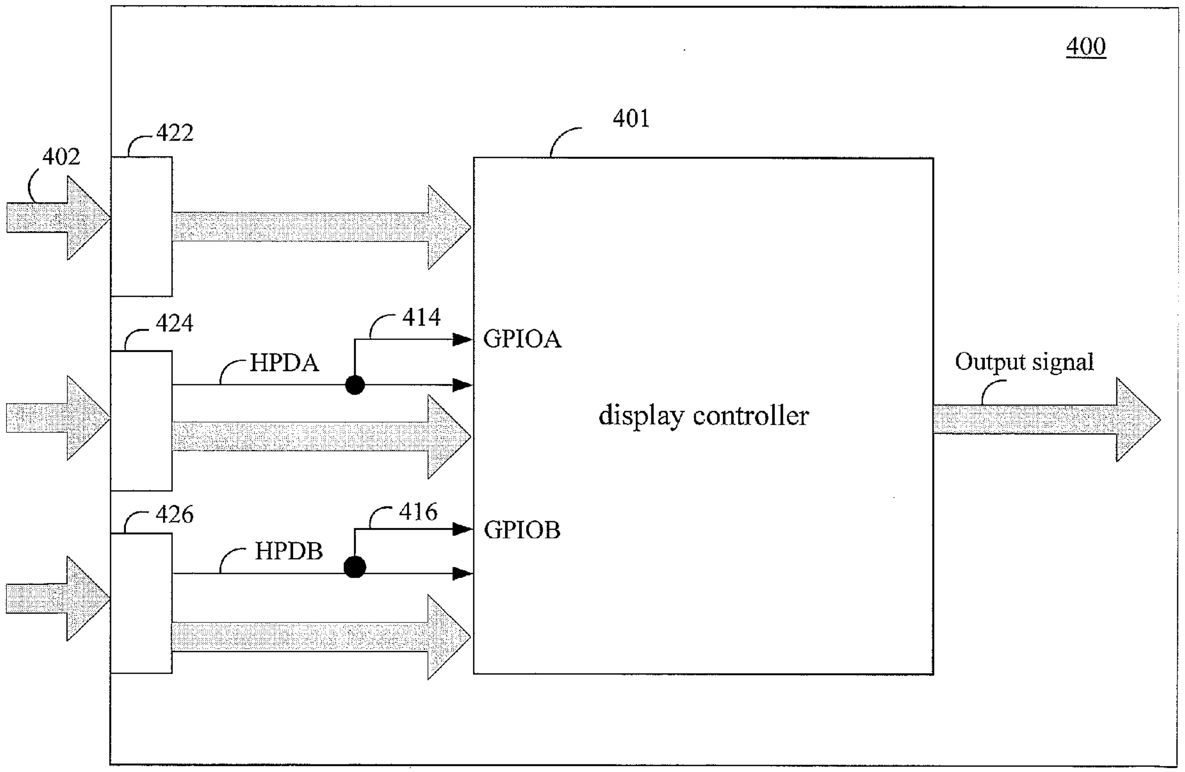
FIG. 4 is a display control circuit according to one embodiment of the invention.

FIG. 4 shows a display control circuit 400 according to an embodiment of the invention. The display control circuit 400 comprises a controller 401 conforming to 1A+2D transmission specifications and further includes an analog video port 422 and two HDMI ports 424, 426 for receiving an analog video signal 402, e.g. a VGA video signal, and two HDMI inputs, respectively. The two HDMI inputs comprise hot-plugging signals HPDA and HPDB. The two HDMI ports 424, 426 receive the hot-plugging signals HDPA and HPDB, respectively. The display controller 401 usually has a plurality of general purpose input/output (GPIO) pins, designated as GPIOA and GPIOB, which receive the two hot-plugging signals HPDA and HDPB from the two HDMI ports 424, 426 via signal paths 414 and 416 for detection.

The display controller 401 determines whether the corresponding HDMI ports 424, 426 have valid transmission by detecting whether GPIOA and GPIOB are asserted. When an HDMI signal is transmitted, a corresponding hot-plugging signal is asserted. Therefore, the display controller 401 in FIG. 4 determines whether valid transmission is taking place in the corresponding HDMI ports 424, 426 by detecting whether GPIOA and GPIOB are asserted. For example, the display controller 401 conforming to 1A+2D transmission specifications, first detects whether a signal assertion is present at GPIOA for approximately 0.5 second, or even as short as to 0.1 second. In the event that a signal assertion is detected on GPIOA, the hot-plugging signal HPDA is asserted. The display controller 401 then determines the HDMI signal at the corresponding HDMI port 424 or 426 is valid, and continues to decrypt HDCP data in the HDMI signal to output a TMDS signal. Vice versa, if a signal assertion is not detected on GPIOA within 0.5 second, the display controller 401 quickly switches to GPIOB to detect whether the HDMI signal at the other HDMI port 424 or 426 is valid. In the event that a signal assertion is detected on GPIOB, the hot-plugging signal HPDB is asserted. The display controller 401 then determines the HDMI signal at the corresponding HDMI port 424 or 426 is valid, and continues to decrypt HDCP data in the HDMI signal to output a TMDS signal. Vice versa, if a signal assertion is not detected on GPIOB within 0.5 second, the display controller 401 quickly switches to the analog video port 422 to detect whether the analog video signal 402 at the analog video port 422, e.g. VGA video signal, is valid. A typical detection period for VGA port is approximately 0.5 second. Then the display controller 401 produces an output signal to a monitor or flat-panel display according to the port signal detected.

According to the aforesaid embodiment, time needed to complete signal detection at the analog video port 422 and the two HDMI ports 424, 426 is 0.5+0.5+0.5=1.5 seconds, or even less (e.g., 0.1+0.1+0.5=0.7 second), which is far less than the 2-second time requirement expected in the industry.

Figure 5:
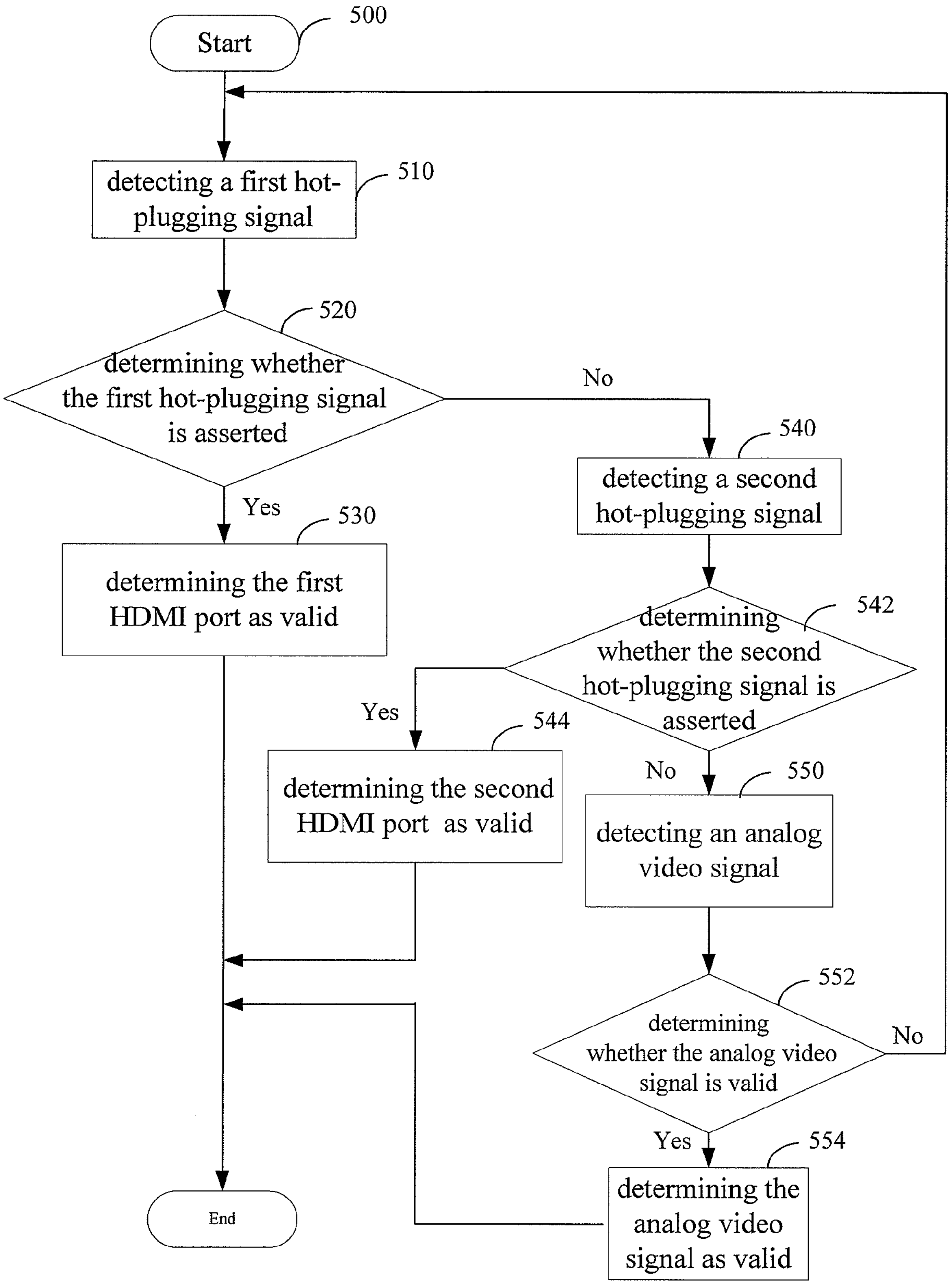
FIG. 5 is a flow chart showing the quick port-switching method according to one embodiment of the invention.

FIG. 5 is a flow chart showing the quick port-switching method according to an embodiment of the invention. In this embodiment, the quick port-switching method between an analog video port and two HDMI ports starts at step 500. At step 510, detect a first hot-plugging signal. At step 520, determine whether the first hot-plugging signal is asserted. Step 520 is followed by step 530 in case of the first hot-plugging signal is asserted, or step 540 if the first hot-plugging signal is not asserted. At step 530, determine a first HDMI port corresponding to the first hot-plugging signal is valid provided the first hot-plugging signal is asserted. At step 540, switch to a second HDMI port when the first hot-swapping signal is not asserted, and detect a second hot-swapping signal. At step 542, determine whether the second hot-plugging signal is asserted. Step 542 is followed by step 544 in case of the first hot-plugging signal is asserted, or step 550 if the second hot-plugging signal is not asserted. At step 544, determine a second HDMI port corresponding to the second hot-swapping signal is valid provided the second hot-swapping signal is asserted. At step 550, switch to an analog video port when the second hot-swapping signal is not asserted, and detect an analog video signal such as a VGA signal. At step 552, determine whether the analog video signal is valid. If yes, proceed to step 554 for determining the analog video signal is valid. If not, proceed to step 510 to re-start detection.

To sum up, the present invention provides a display control circuit comprising a display controller, a first TMDS (Transition Minimized Differential Signal) port, a second TMDS port, and an analog video port. The display control circuit has a first GPIO pin and a second GPIO pin. The first TMDS port, second TMDS port and analog video port are coupled to the display controller, and are for receiving a first TMDS input, a second TMDS input and an analog video signal, respectively. The first TMDS input and second TMDS input comprise a first hot-plugging signal and a second hot-plugging signal to be received by the first GPIO pin and second GPIO pin, respectively. The display controller determines whether the first TMDS input is valid by detecting whether the first hot-plugging signal is asserted, and the display controller determines whether the second TMDS input is valid by detecting whether the second hot-plugging signal is asserted.

The present invention also provides a display controller comprising a first hot-plugging pin, a second hot-plugging pin, a first GPIO pin and a second GPIO pin. The first GPIO pin and second GPIO pin are coupled to the first hot-plugging pin and second hot-plugging pin for receiving a first hot-plugging signal of a first TMDS input, and a second hot-plugging signal of a second TMDS input, respectively. The display controller determines whether the first TMDS input is valid by detecting whether the first hot-plugging signal is asserted, and the display controller determines whether the second TMDS input is valid by detecting whether the second hot-plugging signal is asserted.

The present invention further provides a quick port-switching method comprising steps of detecting a first hot-plugging signal of a first TMDS port to determine whether the first hot-plugging signal is valid by detecting whether the first hot-plugging signal is asserted, followed by reading Extended Display Identification Data (EDID) and decrypting High-bandwidth Digital Content Protection (HDCP) data in sequence; detecting a second hot-plugging signal of a second TMDS port to determine whether the second hot-plugging signal is valid by detecting whether the second hot-plugging signal is asserted; and detecting an analog video signal to determine whether the analog video signal is valid. The TMDS ports are HDMI ports or DVI ports.

For those skilled in the art and in accordance with disclosure of the above-mentioned embodiment, the present invention can be applied to multiple HDMI ports or DVI ports. Both of HDMI port and DVI port transmit TMDS signals. Hence, HDMI ports and DVI ports are also commonly referred to as TMDS ports.

While the invention has been described in terms of what is presently considered to be the most practical and preferred embodiments, it is to be understood that the invention need not to be limited to the above embodiments. For example, the method according to the invention is yet capable of shortening time needed to complete detection of multiple HDMI/DVI ports, without a VGA signal necessarily being present. Various modifications and similar arrangements included within the spirit and scope of the appended claims can be made in accordance with the broadest interpretation so as to encompass all such modifications and similar structures.

What is claimed is:

1. A display control circuit comprising:

a display controller having a first general purpose input/output (GPIO) pin and a second GPIO pin;

a first TMDS port, coupled to the display controller, for receiving a first TMDS input comprising a first hot-plugging signal; and a second TMDS port, coupled to the display controller, for receiving a second TMDS input comprising a second hot-plugging signal;

wherein, the first GPIO pin receives the first hot-plugging signal when present, and the second GPIO pin receives the second hot-plugging signal when present.

2. The display control circuit according to claim 1, wherein the display controller determines whether the first TMDS signal is valid by detecting whether the first hot-plugging signal is asserted.

3. The display control circuit according to claim 1, wherein the display controller determines whether the second TMDS signal is valid by detecting whether the second hot-plugging signal is asserted.

4. The display control circuit according to claim 1 further comprising an analog video port, coupled to the display controller, for receiving an analog video signal.

5. The display control circuit according to claim 1, wherein each of the TMDS ports is an HDMI port.

6. The display control circuit according to claim 1, wherein one of the TMDS ports is a DVI port.

7. A display controller comprising:

a first hot-plugging pin for receiving a first hot-plugging signal of a first TMDS input;

a second hot-plugging pin for receiving a second hot-plugging signal of a second TMDS input;

a first GPIO pin, coupled to the first hot-plugging pin; and a second GPIO pin, coupled to the second hot-plugging pin;

wherein, the first GPIO pin receives the first hot-plugging signal when present, and the second GPIO pin receives the second hot-plugging signal when present.

8. The display controller according to claim 7, wherein the display controller determines whether the first TMDS input is valid by detecting whether the first hot-plugging signal is asserted.

9. The display controller according to claim 7, wherein the display controller determines whether the second TMDS input is valid by detecting whether the second hot-plugging signal is asserted.

10. The display controller according to claim 7, further comprising an analog video port, coupled to the display controller, for receiving an analog video signal.

11. The display control circuit according to claim 7, wherein each of the TMDS inputs is an HDMI port.

12. The display control circuit according to claim 7, wherein each of the TMDS inputs is a DVI port.

13. A quick port-switching method comprising steps of:

detecting a first hot-plugging signal of a first TMDS port to determine whether the first hot-plugging signal is asserted;

detecting a second hot-plugging signal of a second TMDS port to determine whether the second hot-plugging signal is asserted; and based on a result of the detecting steps, causing, at a display controller, a port switch to the first or the second TMDS port accordingly.

14. The quick port-switching method according to claim 13, further comprising a step of detecting an analog video signal for determining whether the analog video signal is valid.

15. The quick port-switching method according to claim 13, wherein the step of detecting the first hot-plugging signal determines the first TMDS port is valid when the first hot-plugging signal is asserted.

16. The quick port-switching method according to claim 13, wherein the step of detecting the second hot-plugging signal determines the second TMDS port is valid when the second hot-plugging signal is asserted.

17. The quick port-switching method according to claim 13, wherein each of the TMDS inputs is an HDMI port.

18. The quick port-switching method according to claim 13, wherein each of the TMDS inputs is a DVI port.

19. The quick port-switching method according to claim 15, further comprising a step of reading EDID data.

20. The quick port-switching method according to claim 15, further comprising a step of decrypting HDCP data.

* * * * *